US 6,596,437 B2

(12) United States Patent
Yoon et al.

(10) Patent No.: US 6,596,437 B2
(45) Date of Patent: Jul. 22, 2003

(54) ACTIVE MATERIAL FOR NEGATIVE ELECTRODE USED IN LITHIUM-ION BATTERY AND METHOD OF MANUFACTURING SAME

(75) Inventors: Sang-young Yoon, Seoul (KR); Jeong-ju Cho, Suwon-si (KR); Jae-yul Lyu, Suwon-si (KR)

(73) Assignee: Samsung Display Devices Co., Ltd. (KR)

( * ) Notice: Subject to any disclaimer, the term of this patent is extended or adjusted under 35 U.S.C. 154(b) by 68 days.

(21) Appl. No.: 09/923,908

(22) Filed: Aug. 6, 2001

(65) Prior Publication Data

US 2002/0076614 A1 Jun. 20, 2002

Related U.S. Application Data

(62) Division of application No. 09/285,277, filed on Apr. 2, 1999, now abandoned.

(30) Foreign Application Priority Data

| Apr. 2, 1998 | (KR) | 98-11609 |
| Apr. 20, 1998 | (KR) | 98-13962 |

(51) Int. Cl.[7] .................................. H01M 4/58
(52) U.S. Cl. ..................... 429/231.95; 429/231.4; 429/231.8; 429/218.1
(58) Field of Search ................. 929/231.4, 231.8, 929/218.1, 231.95

(56) References Cited

U.S. PATENT DOCUMENTS

| 4,492,670 A | * | 1/1985 | Mizrah et al. | 419/9 |
| 5,116,592 A | * | 5/1992 | Weinberg | 423/415.1 |
| 5,162,176 A | * | 11/1992 | Herr et al. | 429/194 |
| 5,225,296 A | * | 7/1993 | Ohsawa et al. | 429/213 |
| 5,344,726 A | * | 9/1994 | Tanaka et al. | 429/209 |
| 5,591,547 A | * | 1/1997 | Yoneda et al. | 429/220 |
| 5,723,232 A | * | 3/1998 | Yamada et al. | 429/245 |
| 5,879,417 A | * | 3/1999 | Yamada et al. | 29/623.5 |
| 5,906,900 A | * | 5/1999 | Hayashi et al. | 429/231.8 |
| 5,965,296 A | * | 10/1999 | Nishimura et al. | 429/231.8 |
| 6,027,833 A | * | 2/2000 | Ueda et al. | 429/218.1 |
| 6,040,092 A | * | 3/2000 | Yamada et al. | 429/331 |
| 6,087,044 A | * | 7/2000 | Iwase et al. | 429/231.8 |
| 6,103,423 A | * | 8/2000 | Itoh et al. | 429/231.8 |
| 6,316,146 B1 | * | 11/2001 | Watanabe et al. | 429/231.8 |

FOREIGN PATENT DOCUMENTS

| EP | 808798 | * | 11/1997 |
| JP | 10040914 | * | 2/1998 |

* cited by examiner

*Primary Examiner*—Tom Dunn
*Assistant Examiner*—Colleen P. Cooke
(74) *Attorney, Agent, or Firm*—Blakely Sokoloff Taylor & Zafman

(57) ABSTRACT

Disclosed is negative electrode active material for lithium ion batteries and a method for manufacturing the same. The active material includes a crystalline carbon core; and an amorphous or turbostratic carbon shell evenly covering the crystalline carbon core, the carbon shell having a thickness of 10–2000 Å. The method includes the steps of chemically combining a crystalline carbon and an amorphous carbon precursor; removing remaining amorphous carbon precursor not reacted in the chemical combination; and heat-treating a chemical combination material of graphite and the amorphous carbon precursor obtained in the chemical combination.

6 Claims, 4 Drawing Sheets

ACTIVE MATERIAL FOR NEGATIVE ELECTRODE USED IN LITHIUM-ION BATTERY AND METHOD OF MANUFACTURING SAME

This is a divisional application of Ser. No. 09/285,277 filed Apr. 2, 1999 abandoned.

BACKGROUND OF THE INVENTION (a) Field of the Invention

The present invention relates to active material for a negative electrode used in lithium-ion batteries, and more particularly, to active material for a negative electrode used in lithium-ion batteries in which the active material made from a crystalline carbon core and an amorphous or turbostratic carbon shell. The present invention also relates to a method of manufacturing such active material.

(b) Description of the Related Art

Carbonaceous material is typically used for the active material in negative electrodes of lithium-ion batteries. There are two basic types of carbonaceous active material for negative electrodes: crystalline carbon and amorphous carbon. Among the different variations of crystalline carbon, graphite is most commonly used, whereas either soft carbon obtained by heat-treating pitch at approximately 1000° C. or hard carbon obtained by carbonizing a polymer resin is generally used for the amorphous carbon.

In the case where graphite is utilized in the lithium-ion battery, the manufacture of high voltage batteries is possible since an oxidation reducing potential of this material is low. Further, because of the exceptional voltage flatness of graphite, voltage is evenly discharged, and a high coulomb efficiency of a first cycle is achieved. Here, coulomb efficiency refers to a ratio between an intercalated amount of lithium ions and a deintercalated amount lithium ions on the negative electrode. Since the intercalated and deintercalated amounts are substantially equal in the case of graphite (i.e., the ratio is approximately 1:1), this indicates that a high degree of coulomb efficiency is obtained.

However, a drawback of graphite is that its capacity does not exceed 370 mAh/g (the theoretical capacity of graphite being only 372 mAh/g). As a result, when graphite is used as the negative electrode for a battery, ethylene carbonate generally must be used for the electrolyte. A serious problem of ethylene carbonate is that it becomes a solid at room temperature. When in a solid state, ion conductivity of ethylene carbonate is low, and the material becomes difficult to handle during manufacture, i.e., it is difficult to insert into the battery. In addition, ethylene carbonate is an expensive material. If propylene carbonate, which is less costly than ethylene carbonate and remains a liquid at room temperature, is applied as electrolyte in the battery using graphite as the negative electrode, graphite layers are peeled by co-intercalation of the electrolyte, and, as a result, lithium-ion intercalation is not properly realized. Accordingly, the capacity of the battery is reduced.

To remedy the above problem, U.S. Pat. No. 5,344,726 discloses a method in which a hydrocarbon such as propane undergoes pyrolytic deposition on a surface of graphite to obtain a negative electrode active material in which crystalline carbon is coated with amorphous carbon or carbon having a turbostratic structure. Turbostratic structure here refers to a structure displaying an extremely low level of crystallinity and having a small crystal size such that it is identical to the amorphous structure, and also refers to a structure exhibiting some level of disordered orientation.

However, the processes involved in manufacturing the active material of U.S. Pat. No. 5,344,726 are complicated and difficult to perform. Also, during manufacture, in addition to obtaining the desired negative electrode active material, there is also inadvertently produced negative electrode active material of an amorphous carbon structure. When present in the battery, this negative electrode active material reduces charge and discharge efficiency by the influence of the amorphous carbon. Another significant drawback of this method is that the amorphous carbon or turbostratic structure carbon layer can not be evenly formed on the surface of the crystalline carbon.

In addition to the above method, there have been many attempts to introduce amorphous carbon or carbon of a turbostratic structure on the surface of crystalline carbon. However, such attempts typically result in the surface carbon material being mixed with the core into something approaching a simple mixture such that, rather than improving on the advantages of the carbon core and coating, the disadvantages of both these parts of the active material are magnified.

SUMMARY OF THE INVENTION

The present invention has been made in an effort to solve the above problems.

It is an object of the present invention to provide a high yield active material for a negative electrode in which a surface of a crystalline carbon is evenly coated with an amorphous carbon or a carbon of a turbostratic structure.

It is another object of the present invention to provide active material for a negative electrode in which advantages of a crystalline carbon and an amorphous carbon or a turbostratic structure carbon are fully realized.

It is still another object of the present invention to provide a method for manufacturing active material for a negative electrode used in lithium-ion batteries, and to a method for manufacturing a lithium-ion battery using the active material, in which the methods are simple.

To achieve the above object, the present invention provides active material for a negative electrode used in a lithium-ion battery. The active material includes a crystalline carbon core, and a shell coating the core of an amorphous carbon or a turbostratic structure carbon, a thickness of the shell being between 10 and 2000 Å.

Further, a method of manufacturing the active material includes the steps of chemically combining a crystalline carbon and an amorphous carbon precursor, removing remaining amorphous carbon precursor not reacted in the chemical combination, and heat-treating a chemical combination material of graphite and the amorphous carbon precursor obtained in the chemical combination.

In another aspect, a method of manufacturing the active material includes the steps of introducing a reactive functional group to a surface of a crystalline carbon, chemically combining the reactive functional group to an amorphous carbon precursor, and heat-treating a chemical combination material of the crystalline carbon and the amorphous carbon precursor obtained in the chemical combination.

BRIEF DESCRIPTION OF THE DRAWINGS

Further objects and other advantages of the present invention will become apparent from the following description in conjunction with the attached drawings, in which.

DETAILED DESCRIPTION OF THE PRESENT INVENTION

Figure 1:
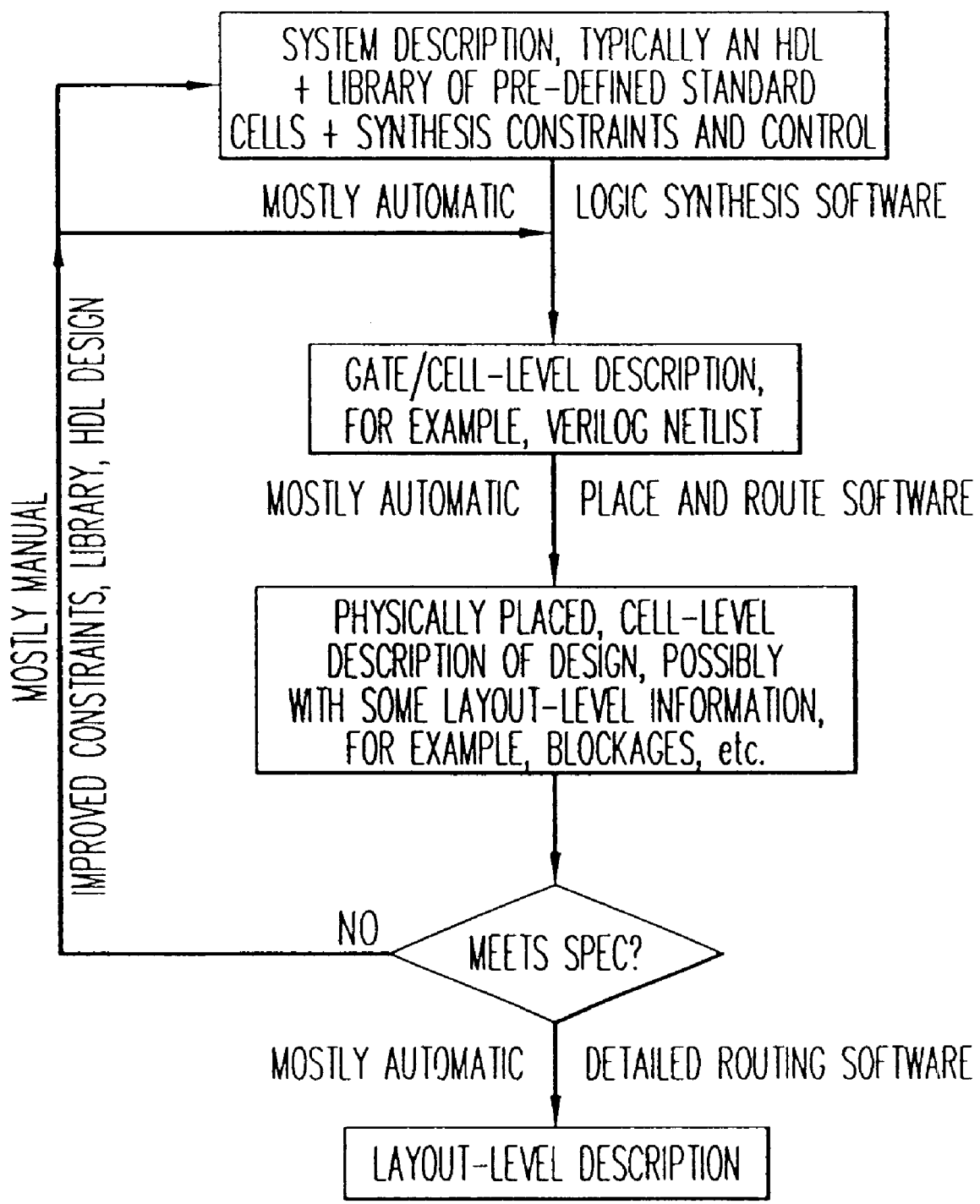
FIG. 1 is a schematic cross-section of negative electrode active material manufactured according to Example 1 of the present invention.

A first method of manufacturing active material for a negative electrode used in a lithium-ion battery according to the present invention includes the steps of chemically combining a crystalline carbon and an amorphous carbon precursor, removing remaining amorphous carbon precursor not reacted in the chemical combination, and heat-treating a chemical combination material of graphite and the amorphous carbon precursor obtained in the chemical combination.

In the first process of chemical combination in the above method, an amorphous carbon precursor is dissolved in an organic solvent such as tetrahydrofuran, an alcohol such as methanol, or an aqueous solution to produce a desired solution. Next, a crystalline carbon is mixed in the solution and reflux-reacted in the same. During the reflux reaction, a variety of functional groups such as a hydroxy group and a hydroxyl carbon or carboxyl group, present on an edge of the crystalline carbon material, are condensation-reacted (e.g., ether combination) with a functional group present in the amorphous carbon precursor such that a combination material of the crystalline carbon and the amorphous carbon precursor is formed.

In the above, either natural carbon or synthetic carbon can be used as the crystalline carbon, and the crystalline carbon can be cylindrical, plate-shaped or fibrous. When selecting the crystalline carbon material, it is preferable to select a carbon material that displays a high capacity and a high energy density, without relation to material type as described above (i.e., natural, synthetic, and structure) or charge/discharge efficiency of a first cycle. For the amorphous carbon precursor, it is possible to use a hard or soft carbon precursor. That is, polyimide resin, furan resin, phenol resin, polyvinyl alcohol resin, cellulose resin, epoxy resin, polystyrene resin, etc. can be used as the hard carbon precursor; and an oil-based material such as petroleum pitch, coal pitch, average grade oil of a low molecular weight, etc. can be used as the soft carbon precursor. Further, in the case where alcohol such as methanol or an aqueous solution solvent is used as a solvent to dissolve the amorphous carbon precursor, it is possible to use a polymer that can dissolve in these solvents as the amorphous carbon precursor. A representative example of such a polymer is polyvinyl alcohol.

In the second process of removing the remaining amorphous carbon precursor not reacted in the chemical combination, by filtering the reflux-reacted solution, remaining amorphous carbon precursor dissolved in the solution is removed such that a powder active material precursor for the negative electrode is obtained. The reflux and filtering processes limit the reaction to only a required level during the chemical combination of the crystalline carbon and the amorphous carbon precursor such that the amount of the crystalline carbon and amorphous carbon precursor used can be efficiently controlled. Further, these processes provide for a more precise organization of the amorphous carbon or turbostratic structure carbon, one of which forms a shell portion of the final, resulting negative electrode active material, in addition to enabling an even amorphous carbon or turbostratic structure carbon layer to be formed. The filtering process also prevents amorphous carbon material, from being present in the negative electrode active material.

In the third process of the inventive first method, the active material precursor obtained as a powder above is heat-treated to produce negative electrode active material having a crystalline carbon core and an amorphous carbon or a turbostratic structure carbon shell. At this time, a heat-treating temperature is such that the amorphous carbon precursor can be converted to amorphous carbon or carbon of a turbostratic structure, i.e. approximately 700–1400° C.

A second method of manufacturing active material for a negative electrode used in a lithium-ion battery according to the present invention includes the steps of introducing a reactive functional group to a surface of a crystalline carbon, chemically combining the reactive functional group with an amorphous carbon precursor, and heat-treating a chemical combination material of the crystalline carbon and the amorphous carbon precursor obtained in the chemical combination.

In the first process of the inventive second method above, it is preferable that the crystalline carbon is selected from the group consisting of cylindrical graphite, plate graphite and fibrous graphite. For the reactive functional group, it is possible to use any functional group which is able to chemically combine with amorphous carbon when introduced on a surface of crystalline carbon, preferably a hydroxyl group. A method of introducing a hydroxyl group on the crystalline carbon surface will now be described.

Crystalline carbon is contacted with sulfuric acid, preferably concentrated sulfuric acid. By processing the sulfuric acid, sulfate ($-HSO_4$) and hydrogen ($-H$) is added to a double bonding of the crystalline carbon surface. After sulfate ($-HSO_4$) is introduced on the double bonding of the crystalline carbon surface, the crystalline carbon is washed with water to substitute the sulfate ($-HSO_4$) with a hydroxyl group ($-OH$), thereby introducing the hydroxyl group.

In the second process of the inventive second method, the reactive functional group introduced on the surface of the crystalline carbon surface is chemically combined preferably with a hydroxyl group and an amorphous carbon precursor. It is preferable that the amorphous carbon precursor is a hard carbon precursor or a soft carbon precursor.

In the above, it is preferable that the hard carbon precursor is selected from the group consisting of polyimide resin, furan resin, phenol resin, polyvinyl alcohol resin, cellulose resin, epoxy resin and polystyrene resin. The hard carbon precursor includes a hydroxyl group and other functional groups which can react with the hydroxyl group introduced on the surface of the crystalline carbon. Accordingly, the functional group of the hard carbon precursor condensation-reacts with the hydroxyl group introduced on the surface of the crystalline carbon to realize an ether combination, thereby producing a combination material of the crystalline carbon and the hard carbon precursor.

Further, with regard to the soft carbon precursor, it is preferable that the soft carbon precursor is selected from the group consisting of petroleum pitch, coal pitch and an oil-based material Further, it is preferable that average grade oil of a low molecular weight is used as the oil-based material. A variety of functional groups having excellent reactivity are also present in the soft carbon precursor. As a result, since the functional groups of the soft carbon precursor condensation-react with the hydroxyl group, introduced on the surface of the crystalline carbon, when an acid or base catalyst is present, a combination material of the crystalline carbon and the soft carbon precursor is produced.

In the third process of the inventive second method, the combination material of the crystalline carbon and the amorphous carbon precursor is heat-treated. It is preferable that the heat-treating process is conducted at a temperature between 700 and 1200° C. By this heat-treating process, the amorphous carbon precursor, which covers the crystalline carbon, is converted into an amorphous carbon. At this time, in the case where a hard carbon precursor is used as the amorphous carbon precursor, negative electrode active material in which a hard carbon shell covers a crystalline core is obtained, whereas in the case where a soft carbon precursor is used as the amorphous carbon precursor, negative electrode active material in which a soft carbon shell covers a crystalline core is obtained.

The active material obtained through the above two methods, with reference to FIG. 1, comprises a crystalline carbon core 1, and an amorphous carbon or a turbostratic structure carbon shell 2 evenly covering the crystalline carbon core 1. It is preferable that an average particle size of the crystalline carbon core 1, i.e. graphite core, is 10–50 $\mu$m. Here, if the particle size is less than 10 $\mu$M since this results in a small overall size of the active material, there is a high probability that side reactions will result during continuous charging and recharging, and when manufacturing the pole plate, there is a limit to increases in a filling density. On the other hand, if particle size exceeds 50 $\mu$m, since this results in a large overall size of the active material, it becomes difficult to evenly coat the active material during manufacture of the pole plate. Also, with a large particle size of over 50 $\mu$m, there is a chance that high rate characteristics will be reduced.

Using X-ray diffraction and argon ion laser Raman spectroscopy to measure characteristics of the core of the negative electrode active material, it was discovered that a distance ($d_{002}$) between layers of the crystalline carbon is preferably 3.35–3.42 Å, and that a ratio ($I_{1360}/I_{1580}$), in an argon ion laser Raman spectra, between a peak value at 1360 cm$^{-1}$ to a peak value at 1580 cm$^{-1}$ is preferably 0.05–0.4.

In the negative electrode active material, it is preferable that a thickness of the amorphous carbon or the turbostratic structure carbon shell is 10–20000 Å, and more preferably 10–1000 Å. Here, if the thickness of the shell is less than 10 Å, since this results in a thickness of an amorphous or turbostratic structure carbon layer being insufficient, if a propylene carbonate electrolyte is applied to the negative material active material, the propylene carbonate is co-intercalated 20 on the crystalline carbon core such that it is possible for battery capacity to be reduced. On the other hand, if the thickness of the shell exceeds 2000 Å, since this substantially reduces the size of the core relative to the shell, it is possible for voltage flatness of the battery using the active material to be reduced.

Further, using X-ray diffraction and argon ion laser Raman spectroscopy to measure characteristics of the core of the negative electrode active material, it was discovered that a distance ($d_{002}$) between layers of the amorphous carbon or turbostratic structure carbon shell is preferably 3.38–3.80 Å, and more preferably 3.40–3.700 Å. In addition, in an argon ion laser Raman spectra, it is preferable that a ratio ($I_{1360}/I_{1580}$) between a peak value at 1360 cm$^{-1}$ to a peak value at 1580 cm$^{-1}$ is 0.3–1.5.

Those skilled in the art to which the present invention pertains will be able to easily manufacture a lithium-ion battery with the inventive negative electrode active material using prior manufacturing methods.

The inventive negative electrode active material is mixed with polyvinylidene fluoride as a binder and N-methylpyrrolidone as a solvent to produce a slurry. The slurry is deposited on a-copper collector to manufacture a negative electrode plate. Also, positive electrode active material of a lithium transition metal oxide is mixed with polyvinylidene fluoride as a binder and N-methylpyrrolidone as a solvent to produce a solvent, after which the slurry is deposited on an aluminum collector to manufacture a positive electrode plate. For the lithium transition metal oxide, it is possible to use $LiCoO_2$, $LiNiO_2$, $LiMn_2O_4$, $LiNi_xCo_{1-x}O_y$ (0<x<1,0<y<2), or $LiNi_xCo_{1-x-y}M_yO_2$ (0<x<1,0<y<1). Furthermore, it is possible to include a trace of F or S, etc., in the lithium transition metal.

Using the above negative electrode plate; the positive electrode plate; a separator made by a polypropylene-based porous polymer; and cyclic carbonate or linear carbonate electrolyte containing lithium salt selected from the group consisting of $LiBF_4$, $LiPF_6$, $LiClO_4$, $LiAsF_6$, $LiN(CF_3O_2)_2$ and $LiCF_3SO_3$, a lithium-ion battery can be manufactured using well-known methods. Since the surface of the inventive negative electrode active material is either amorphous carbon or turbostratic structure carbon, it is possible to use polypropylene carbonate electrolyte.

The present invention is further explained in more detail with reference to the following examples. The invention can be utilized in various ways and is not intended to be confined to those examples.

EXAMPLE 1

20 g of phenol resin, which is an amorphous carbon precursor, was dissolved in tetrahydrofuran, which is an organic solvent, to produce a solution having a 20% concentration. Next, 100 g of a natural graphite powder, which is a crystalline carbon, was mixed in the solution. The resulting solution was reflux-reacted then filtered, thereby obtaining a negative electrode active material precursor in a powder form.

Subsequently, the active material precursor was heat-treated for 2 hours at a temperature of 1000° C. to produce a crystalline active material. The crystalline active material was then evenly mixed with a binder of polyvinylidene fluoride at a concentration of 8% and a solvent of N-methylpyrrolidone to produce a slurry. Following this step, the slurry was then deposited on a collector to manufacture a pole plate. Using this pole plate and lithium metal as an opposing plate, a half cell was manufactured.

EXAMPLE 2

Except for the use of a synthetic graphite powder having an average particle diameter of 6 microns as the crystalline carbon instead of the natural graphite powder, the same method as that used in Example 1 above was used to manufacture a pole plate and half cell.

EXAMPLE 3

100 g of a natural graphite powder, which is a crystalline carbon, was contacted with concentrated sulfuric acid (30% wt aqueous solution) then washed with water. Next, the washed natural graphite powder and 30 g of a phenol resin, which is an amorphous carbon precursor, were refluxed in a tetrahydrofuran solvent to conduct a condensation reaction. A powder obtained after the condensation reaction was carbonized for 2 hours at 1000° C. to manufacture a carbon powder having a crystalline carbon core and an amorphous carbon shell.

Following the above, 27 g of the carbon powder; a polyvinylidene fluoride binder (10 wt %, 3 g); and N-methylpyrrolidone, which is a solvent, were mixed to produce a slurry. The slurry was then deposited on a copper collector and dried to manufacture a pole plate. Using this pole plate and lithium metal as an opposing plate, a battery was manufactured.

EXAMPLE 4

Coal coke was heat-treated at 2800° C. to produce a synthetic graphite having an average particle diameter of 30 μm. except for using this synthetic graphite, rather than the natural graphite, the same method as that used in Example 3 was used to manufacture a pole plate and battery.

EXAMPLE 5

Except for using a synthetic graphite having an average particle diameter of 6 μm, the same method as that used in Example 3 was used to manufacture a pole plate and battery.

EXAMPLE 6

Except for using tetrahydrofuran soluble pitch instead of the phenol resin for an amorphous carbon precursor, the same method as that used in Example 5 was used to manufacture a pole plate and battery.

COMPARATIVE EXAMPLE 1

Evenly mixed together were a natural graphite powder as active material, polyvinylidene fluoride at a concentration of 8% as a binder, and N-methylpyrrolidone as a solvent to produce a slurry. Next, the slurry was deposited on a collector to manufacture a pole plate. Using this pole plate and lithium metal as an opposing plate, a half cell was manufactured.

COMPARATIVE EXAMPLE 2

Except for the use of a synthetic graphite powder having an average particle diameter of 6 microns as the active material instead of the natural graphite powder, the same method as that used in Comparative Example 1 above was used to manufacture a pole plate and half cell.

COMPARATIVE EXAMPLE 3

27 g of a natural graphite powder, which is a crystaline carbon; polyvinylidene fluoride binder (10 wt %, 3 g); and N-methylpyrrolidone, which is a solvent, were mixed to produce a slurry. The slurry was then deposited on a copper collector and dried to manufacture a pole plate. Using this pole plate and lithium metal as an opposing plate, a battery was manufactured.

COMPARATIVE EXAMPLE 4

Coal coke was heat-treated at 2800° C. to produce a synthetic graphite having an average particle diameter of 30 μm. Except for using this synthetic graphite for the active material, rather than the natural graphite, the same method as that used in Comparative Example 3 was used to manufacture a pole plate and battery.

COMPARATIVE EXAMPLE 5

Except for using a synthetic graphite having an average particle diameter of 6 μm, the same method as that used in Comparative Example 3 was used to manufacture a pole plate and battery.

Figure 3:
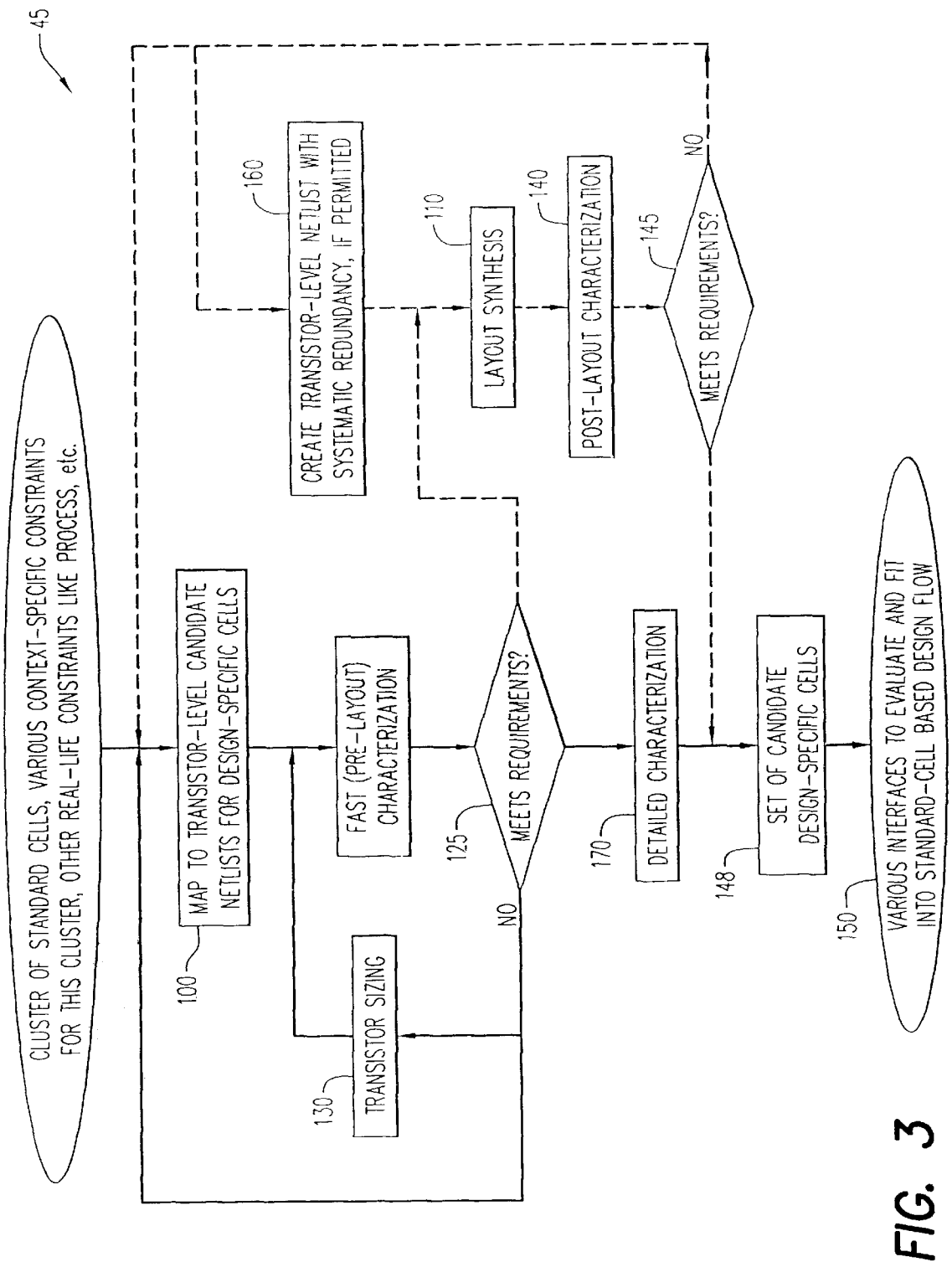
FIG. 3 is a graph illustrating charge/discharge characteristics of Example 1 and Comparative Example 1.

To measure surface characteristics of the active material of Examples 1 and 2, and Comparative Examples 1 and 2, XRD (x-ray diffraction), argon ion laser Raman spectroscopy, and a TEM were used. Results of the measurements are shown in Table 1. Further, results of measurements related to discharge capacity of a first cycle and charge/discharge efficiency in the 20 batteries manufactured according to Examples 1 and 2, and Comparative Examples 1 and 2 appear in Table 1. Here, charge/discharge efficiency is a ratio of discharge capacity to charge capacity. Additionally, high rate charge/discharge and cycle characteristics of Example 1 and Comparative Example 1 are shown in FIG. 3.

TABLE 1

| | Active Material Surface Characteristics | | | | |
|---|---|---|---|---|---|
| | XRD | Raman Spectro-scopy | TEM | | Battery Characteristics |
| | $d_{002}$ (Å) | $I_{360}/I_{1580}$ | Thickness (Å) | Structure | |
| Example 1 | 3.41 | 0.39 | 95 | Turbostratic | 370  91 |
| Example 2 | 3.63 | 0.31 | 15 | Amorphous | 360  89 |
| Comp. Example 1 | 3.35 | 0.2 | — | Crystalline | 330  82 |
| Comp. Example 2 | 3.37 | 0.25 | — | Crystalline | 340  81 |

Figure 2:
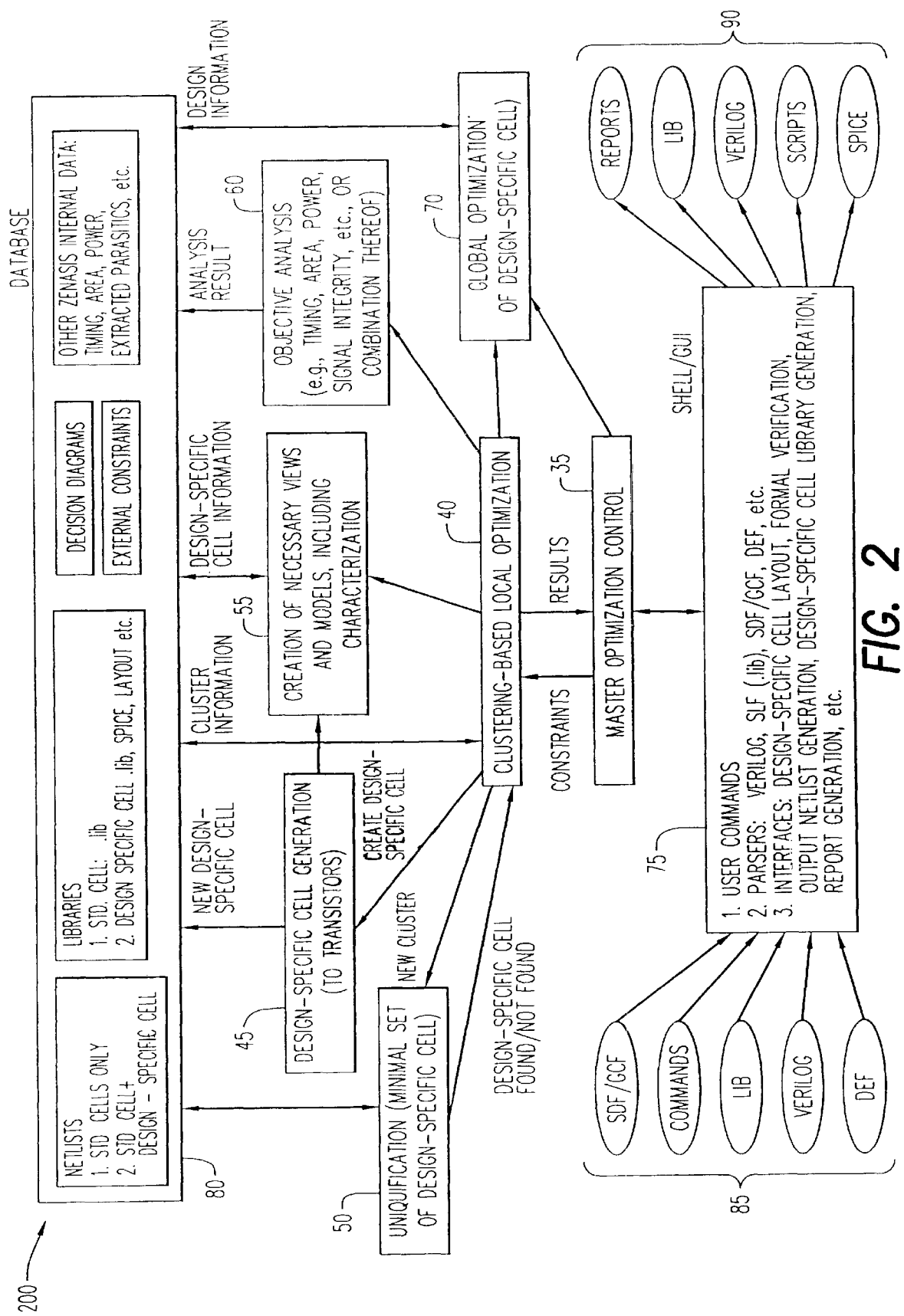
FIG. 2 is a TEM photograph of negative electrode active material manufactured according to Example 1 of the present invention.

Characteristics of the carbon active material and performance of the battery, both manufactured according to Example 1, will now be described with reference to Table 1 above and FIG. 2. As shown in FIG. 2, a carbon layer turbostratic structure on a surface of the crystalline carbon is formed thinly and evenly. Since a measurement of 2.2 cm in the photograph indicates a size of 100 Å, it can be known that the turbostratic structure of Example 1 has a thickness of roughly 95 Å.

An $I_{1360}/I_{1580}$ value measured by argon ion laser Raman spectroscopy is not the actual value measured but is a value derived by taking into account a characteristic of this measurement method of the beam penetrating only the shell portion of the active material. For example, in the case of Example 2, the actual $I_{1360}/I_{1580}$ value was 0.85.

As shown in Table 1, a discharge capacity and a charge/discharge efficiency of the battery of Example 1 are higher than those of Comparative Example 1. Further, as shown in FIG. 3, high rate charge/discharge and cycle characteristics of the battery of Example 1 are significantly superior to those of Comparative Example 1. In addition, with reference to Table 1, the battery manufactured with the carbon active material of Example 2, which has formed an amorphous carbon layer on the surface thereof, has a higher discharge capacity and charge/discharge efficiency than the battery manufactured according to Comparative Example 2.

Reversible capacities and irreversible capacities during a first charge/discharge of the battery according to Examples 3, 4, 5, and 6 and Comparative Examples 3, 4, and 5 are shown in Table 2 below. Further, charge/discharge characteristics of Example 3 and Comparative Example 3 are shown in FIG. 4.

TABLE 2

| | Reversible Capacity (mAh/g) | Irreversible Capacity (mAh/g) | First Charge/Discharge Efficiency |
|---|---|---|---|
| Example 2 | 379.9 | 45.2 | 89.4 |
| Example 4 | 346.7 | 49.8 | 87.4 |
| Example 5 | 358.9 | 70.3 | 83.6 |
| Example 6 | 355.0 | 73.6 | 82.8 |
| Comp. Example 3 | 349.2 | 54.2 | 86.6 |
| Comp. Example 4 | 328.1 | 142.9 | 69.7 |
| Comp. Example 5 | 344.0 | 85.9 | 80.0 |

Figure 4:
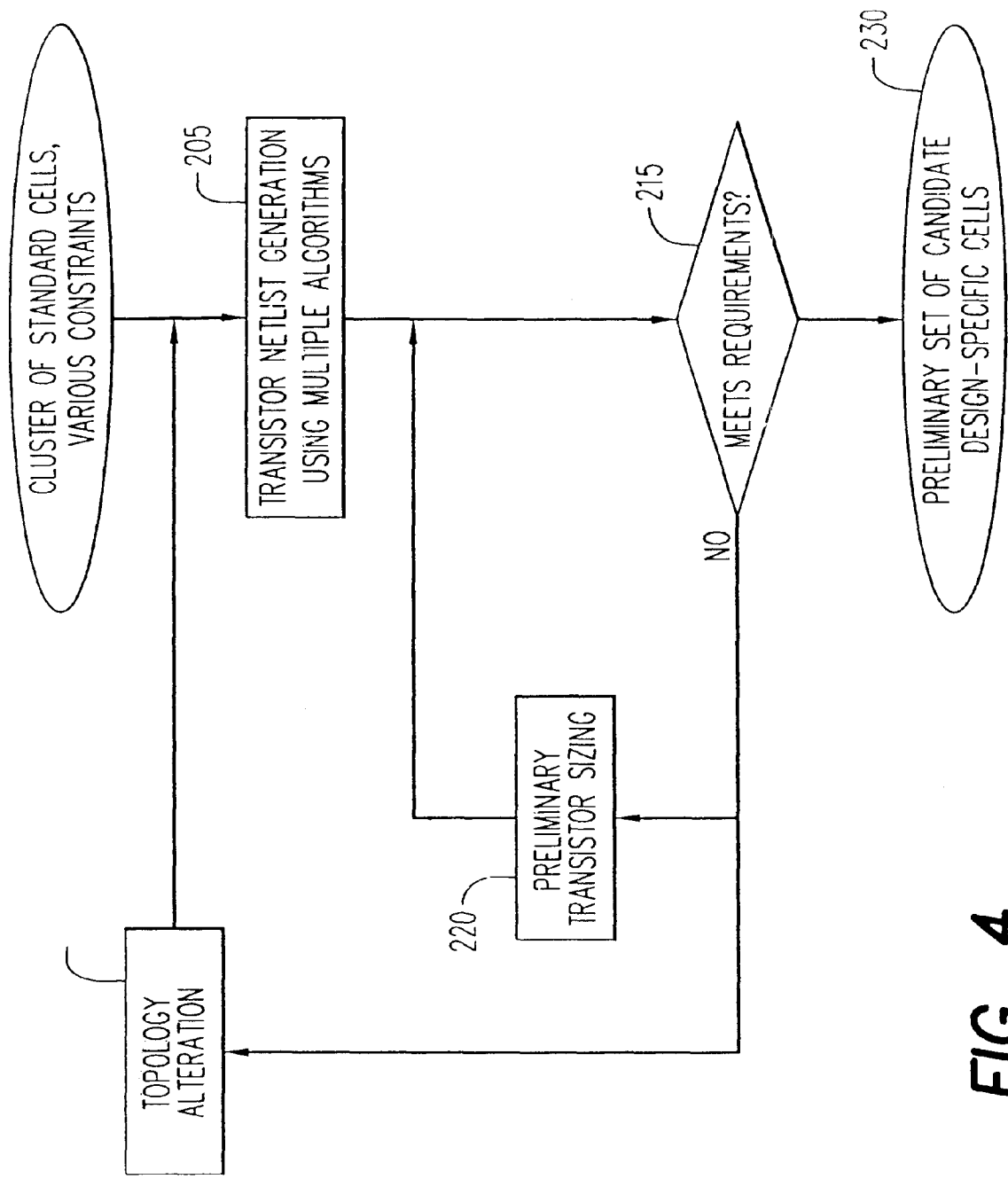
FIG. 4 is a graph illustrating charge/discharge and cycle characteristics of Example 1 and Comparative Example 1.

As shown in FIG. 4 and Table 2, a reversible capacity and an irreversible capacity of Example 3 are respectively larger and smaller than those of Comparative Example 3, and a charge/discharge efficiency of Example 3 is greater than that of Comparative Example 3. Example 4 also has superior reversible capacity and charge/discharge efficiency characteristics compared to Comparative Example 4, and has a smaller irreversible capacity than Comparative Example 4. Additionally, an irreversible capacity of Example 5 is considerably smaller than that of Comparative Example 5, and a charge/discharge efficiency of Example 5 is greater than that of Comparative Example 5.

Although the present invention has been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of manufacturing negative electrode active material for lithium ion batteries comprising the steps of:

introducing a reactive functional group to a surface of a crystalline carbon;

chemically combining the reactive functional group with an amorphous carbon precursor; and heat-treating a chemical combination material of the crystalline carbon and the amorphous carbon precursor obtained in the chemical combination.

2. The method of claim 1 wherein the reactive functional group is a hydroxyl group.

3. The method of claim 2 wherein the step of introducing the hydroxyl group further comprises the steps of:

contacting the crystalline carbon to sulfuric acid; and washing using water the crystalline carbon to which sulfate has been introduced by contact with sulfuric acid.

4. The method of claim 1 wherein the amorphous carbon precursor is a hard carbon precursor selected from the group consisting of polyimide resin, furan resin, phenol resin, polyvinyl alcohol resin, cellulose resin, epoxy resin, and polystyrene resin.

5. The method of claim 1 wherein the amorphous carbon precursor is a soft carbon precursor selected from the group consisting of petroleum pitch, coal pitch and an oil-based material.

6. The method of claim 1 wherein the heat-treating is performed at a temperature between 700 and 1400° C.

* * * * *